US009546051B2

(12) United States Patent
Roberge et al.

(10) Patent No.: US 9,546,051 B2
(45) Date of Patent: Jan. 17, 2017

(54) SYSTEM FOR INCREASING THROUGHPUT OF AN AGRICULTURAL PRODUCT METERING SYSTEM

(71) Applicant: CNH Canada, Ltd., Saskatoon (CA)

(72) Inventors: Martin J. Roberge, Saskatoon (CA); Chance Peutert, Assiniboia (CA); Rex LeRoy Ruppert, Benson, MN (US); Bradley Dennis Hansen, Montevideo, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 85 days.

(21) Appl. No.: 14/109,287

(22) Filed: Dec. 17, 2013

(65) Prior Publication Data

US 2015/0166269 A1 Jun. 18, 2015

(51) Int. Cl.
| | |
|---|---|
| B65G 53/14 | (2006.01) |
| B65G 53/04 | (2006.01) |
| B65G 53/40 | (2006.01) |
| B65G 53/52 | (2006.01) |

(52) U.S. Cl.
CPC ............... B65G 53/04 (2013.01); B65G 53/40 (2013.01); B65G 53/528 (2013.01)

(58) Field of Classification Search
CPC .................................................... B65G 53/14
USPC .. 406/123, 144, 92, 118, 154, 194; 111/174; 110/288
See application file for complete search history.

(56) References Cited

U.S. PATENT DOCUMENTS

| | | | | | |
|---|---|---|---|---|---|
| 3,403,942 | A | * | 10/1968 | Farnworth | ......... B65G 53/4633 |
| | | | | | 222/368 |
| 3,490,654 | A | * | 1/1970 | Fischer | .................. B65G 53/66 |
| | | | | | 111/130 |
| 3,656,661 | A | * | 4/1972 | Schumacher | .......... A01C 7/102 |
| | | | | | 111/174 |

(Continued)

FOREIGN PATENT DOCUMENTS

| | | |
|---|---|---|
| CN | 102815536 A | 12/2012 |
| DE | 3722986 A1 | 1/1989 |

(Continued)

OTHER PUBLICATIONS

Bertolini Trailed Spray Packs [online], [retrieved on Dec. 17, 2013]. http://dynamicltd.co.nz/products/spraying-equipment/trainer-sprayers/.

*Primary Examiner* — Joseph Dillon, Jr.
(74) *Attorney, Agent, or Firm* — Rebecca L. Henkel; Rickard K. DeMille (57) ABSTRACT

A system includes a product delivery tube having an air inlet, an agricultural product inlet, and an exit nozzle. The agricultural product inlet is disposed between the air inlet and the exit nozzle, and the first product delivery tube is configured to receive the agricultural product from the agricultural product inlet, and to use an air flow received by the air inlet to convey the agricultural product through the exit nozzle. The system also includes a drop tube configured to receive the agricultural product, and to convey the agricultural product at a drop tube angle to the agricultural product inlet. The drop tube angle is formed by a junction between the first drop tube and the first product delivery tube, and the drop tube angle is greater than approximately 0 degrees and less than approximately 90 degrees relative to the product delivery tube.

15 Claims, 5 Drawing Sheets

(56) References Cited

U.S. PATENT DOCUMENTS

| | | | | |
|---|---|---|---|---|
| 3,777,874 | A * | 12/1973 | Birckhead | B05B 5/032 118/308 |
| 4,392,439 | A | 7/1983 | Herriau | |
| 4,536,121 | A * | 8/1985 | Stewart | B65G 53/4641 222/270 |
| 4,646,941 | A * | 3/1987 | Grosse-Scharmann | A01C 7/102 111/171 |
| 4,666,347 | A * | 5/1987 | Janssen | B65G 53/30 137/888 |
| 4,779,765 | A | 10/1988 | Neumeyer | |
| 4,793,742 | A * | 12/1988 | Strand | A01M 9/003 222/272 |
| 4,900,199 | A * | 2/1990 | Spaulding | B05B 7/1445 406/121 |
| 4,964,575 | A | 10/1990 | Takata | |
| 5,052,627 | A | 10/1991 | Balmer | |
| 5,092,526 | A | 3/1992 | Takata | |
| 5,114,078 | A | 5/1992 | Takata | |
| 5,494,381 | A * | 2/1996 | Heyl | B65G 53/66 406/14 |
| 5,592,889 | A * | 1/1997 | Bourgault | A01C 15/006 111/174 |
| 5,915,313 | A | 6/1999 | Bender et al. | |
| 6,668,738 | B2 | 12/2003 | Lee et al. | |
| 6,892,909 | B1 * | 5/2005 | Hebert | A01C 7/081 111/174 |
| 7,144,204 | B2 * | 12/2006 | Hilgraf | B65G 53/521 406/128 |
| 7,413,387 | B2 | 8/2008 | Pleyer | |
| 7,798,079 | B2 * | 9/2010 | Memory | A01C 7/081 111/174 |
| 8,348,556 | B2 * | 1/2013 | Hilgraf | F23K 3/02 110/105 |
| 8,425,160 | B2 * | 4/2013 | Curle | B65D 88/32 166/162 |
| 2001/0041103 | A1 * | 11/2001 | Pfeiffer | B65G 53/14 406/144 |
| 2006/0153649 | A1 * | 7/2006 | Folstadt, Jr. | B65G 53/58 406/144 |
| 2012/0103238 | A1 | 5/2012 | Beaujot | |
| 2012/0272881 | A1 * | 11/2012 | Georgison | A01C 7/081 111/175 |

FOREIGN PATENT DOCUMENTS

| | | |
|---|---|---|
| EP | 0331302 A1 | 9/1989 |
| EP | 2570016 A1 | 3/2013 |
| RU | 2426295 C1 | 8/2011 |

\* cited by examiner

SYSTEM FOR INCREASING THROUGHPUT OF AN AGRICULTURAL PRODUCT METERING SYSTEM

BACKGROUND

The invention relates generally agricultural systems, and more specifically to systems for increasing throughput of an agricultural product in an agricultural product metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an Air Cart is used to deliver product (e.g., seeds, fertilizer, etc.) to ground engaging tools or spraying nozzles. Certain air carts include a metering system configured to deliver metered quantities of product into an airflow that transfers the product to the delivery nozzles. In other certain applications, an agricultural product application equipment, herein called a floater, is used to deliver product to distribute and simply spread out evenly onto the ground. When the metered quantities of agricultural product are delivered into the airflow of a delivery tube, the throughput of the product is less than desirable. As the agricultural product meets with the airflow, the airflow is either not fast enough to move the agricultural product effectively, or the agricultural product takes too much of the kinetic energy from the airflow so that there is not enough remaining energy to convey the agricultural product down the delivery tube.

BRIEF DESCRIPTION

In one embodiment, a system for increasing throughput of an agricultural product in an agricultural product delivery system includes a product delivery tube having an air inlet, an agricultural product inlet, and an exit nozzle. The agricultural product inlet is disposed between the air inlet and the exit nozzle, and the first product delivery tube is configured to receive the agricultural product from the agricultural product inlet, and to use an air flow received by the air inlet to convey the agricultural product through the exit nozzle. The system also includes a drop tube configured to receive the agricultural product, and to convey the agricultural product at a drop tube angle to the agricultural product inlet. The drop tube angle is formed by a junction between the first drop tube and the first product delivery tube, and the drop tube angle is greater than approximately 0 degrees and less than approximately 90 degrees relative to the product delivery tube.

In another embodiment, a system for increasing throughput of an agricultural product in an agricultural product delivery system includes a drop tube configured to receive the agricultural product, and to convey the agricultural product to an agricultural product inlet. The system also includes a product delivery tube that has an air inlet, the agricultural product inlet, and an exit nozzle. The product delivery tube is configured to convey the agricultural product between agricultural product inlet and the exit nozzle. An internal diameter of a passage through the product delivery tube decreases between the air inlet and the agricultural product inlet.

In a further embodiment, a system for increasing throughput of an agricultural product metering system includes a product delivery tube having an air inlet, an agricultural product inlet, and an exit nozzle. The product delivery tube is configured to convey an agricultural product between the agricultural product inlet and the exit nozzle, and an internal diameter of a passage through the product delivery tube decreases between the air inlet and the agricultural product inlet. The system also includes a drop tube configured to convey the agricultural product at a drop tube angle to the agricultural product inlet. The drop tube angle is formed by the drop tube and the product delivery tube, and the drop tube angle is greater than approximately 0 degrees and less than approximately 90 degrees.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
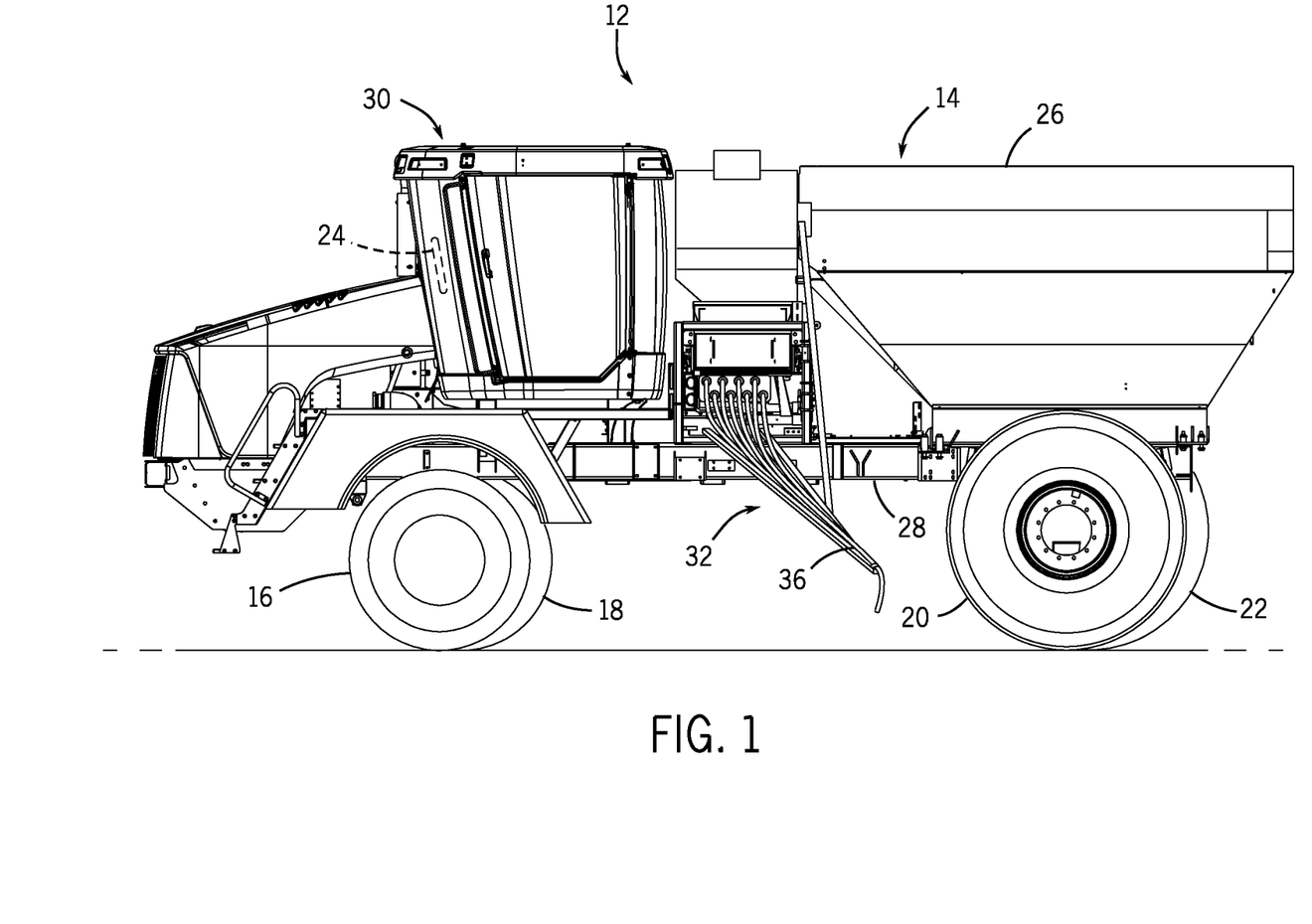
FIG. 1 is a side view of an embodiment of a floater having a product delivery system that may use the Venturi effect to increase throughput of the product delivery system.
Figure 2:
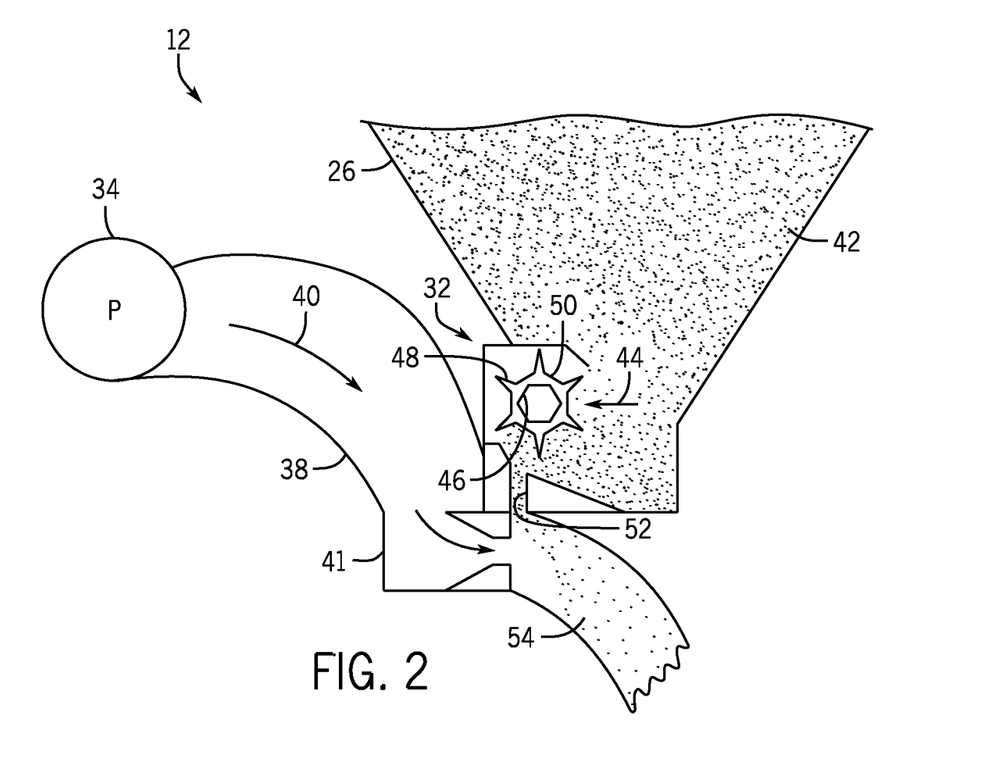
FIG. 2 is a schematic diagram of an embodiment of a product delivery system having a product distribution box that uses the Venturi effect and may be employed within the floater of FIG. 1.

With the foregoing in mind, FIG. 1 illustrates an exemplary agricultural vehicle, in this case a floater 12. As will be appreciated, the floater 12 is merely an example, and the present embodiments may be used in any type of agricultural vehicle (e.g., combines, sprayers, air seeders, planters, etc.) which may benefit from increased throughput of an agricultural product. The floater 12 includes a body 14 that may house an engine, transmission, and power train (not separately shown). The floater 12 has a front left wheel 16, a front right wheel 18, a rear left wheel 20, and a rear right wheel 22. The floater 12 also includes a steering wheel 24, a storage tank 26, a frame 28, a cabin 30, a product delivery system 32, and an air source 34 (FIG. 2). In certain configurations, the storage tank 26 includes multiple compartments for storing various flowable particulate agricultural products. For example, one compartment may include seeds, and another compartment may include a dry fertilizer. In such configurations, the floater 12 may be configured to deliver both the seeds and fertilizer. Seeds and/or fertilizer within the storage tank 26 are conveyed or augered to an elevation then gravity fed into the product delivery system 32.

The product delivery system 32 may include metering rollers 44 (FIG. 2) or a conveyor belt with a gate to regulate the flow of agricultural product from the storage tank 26 into an air flow provided by the air source 34. The air flow then carries the agricultural product through a hose 36 onto the soil. A control assembly may be communicatively coupled to the product delivery system 32 and the air source 34 to regulate flow of product through the hose 36, or a conduit 38 as described below. The control assembly may include a spatial locating device, such as a Global Positioning System (GPS) receiver. In such a configuration, the control assembly will receive geographical position information from the GPS receiver, thereby facilitating position determination of the floater 12. As such, the control assembly may implement "Smart Farming" whereby the product delivery system 32 is controlled based on the geographical position of the product delivery system 32 and/or floater 12.

FIG. 2 is a schematic diagram of an embodiment of the product delivery system 32 having a product distribution box that uses the Venturi effect and may be employed within the floater of FIG. 1. As illustrated, the air source 34 is coupled to a conduit 38 (e.g., product delivery tube) configured to enable airflow 40 through a product distribution box 41 of the product delivery system 32. The conduit 38 may extend from an air source 34 through the product distribution box 41, or separate hose/conduits may be used (i.e., a first conduit 38 may be used to attach the air source 34 to the product distribution box 41 while a second conduit/hose runs from the product distribution box 41). In other embodiments, the conduit 38 may include multiple conduit sections with one conduit section coupling the air source 34 to the top of the product delivery system 32 and another conduit section coupling the product distribution box 41 of the product delivery system 32 to the floater 12. In such a configuration, airflow 40 flows through the product delivery system 32, from top to bottom. The airflow 40 enters the product delivery system 32, combines with the metered product, and exits the product delivery system 32 as a mixture of product and air 54.

The air source 34 may be a pump or blower powered by an electric or hydraulic motor, for example. Flowable particulate agricultural product 42 (e.g., seeds, fertilizer, etc.) within the storage tank 26 flows by gravity into the product delivery system 32. The product delivery system 32 may use any suitable metering system such as meter rollers, air locks, rotary valves, etc. The product delivery system 32 in the illustrated embodiment includes a meter roller 44. However, in certain embodiments, more than one meter roller 44 may be configured to regulate the flow of agricultural product 42 into the air flow 40. For example, the product delivery system 32 may include multiple meter rollers 44 disposed adjacent to one another along a longitudinal axis of the rollers 44. Or in other embodiments, the meter rollers 44 may be positioned so their rotational axes are parallel to one another. For example, certain metering systems 32 include eight meter rollers 44 arrange in a linear configuration. Such systems 32 are known as "8-run" metering assemblies. However, alternative embodiments may include more or fewer meter rollers 44, e.g., 5, 10, 18, or more. Additionally, as mentioned above, the metering may be accomplished by a conveyor belt and gate to regulate flow of the agricultural product.

Each meter roller 44 includes an interior passage/cavity 46 configured to receive a shaft that drives the meter roller 44 to rotate. In the illustrated embodiment, the cavity 46 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 44. Alternatively, in certain embodiments, the meter rollers 44 may be coupled to a wheel by a gear assembly such that rotation of the wheel drives the meter rollers to rotate. Such a configuration will automatically vary the rotation rate of the meter rollers 44 based on the speed of the floater.

Each meter roller 44 also includes multiple ridges 48 and flutes 50. The number and geometry of the flutes 50 are particularly configured to accommodate the agricultural product 42 being distributed. The illustrated embodiment includes six flutes 50 and a corresponding number of ridges 48. Alternative embodiments may include more or fewer flutes 50 and/or ridges 48. For example, the meter roller 44 may include 2, 4, 6, 8, 10, 12, 14, 16, 18, 20, or more flutes 50 and/or ridges 48. In addition, the depth of the flutes 50 and/or the height of the ridges 48 are configured to accommodate the agricultural product 42 within the storage tank 26. For example, a meter roller 44 having deeper flutes 50 and fewer ridges 48 may be employed for larger seeds, while a meter roller 44 having shallower flutes 50 and more ridges 48 may be employed for smaller seeds. Other parameters such as flute pitch (i.e., rotation relative to a longitudinal axis) and flute angle (i.e., rotation relative to a radial axis) may also be varied in alternative embodiments. Furthermore, in certain embodiments, a meter roller 44 having variable geometry flutes 50 may be employed to accommodate a variety of seed sizes.

For a particular meter roller configuration, the rotation rate of the meter roller 44 controls the flow of agricultural product 42 into the air stream 40. Specifically, as the meter roller 44 rotates, agricultural product is transferred through a drop tube 52 in the product distribution box 41. The agricultural product then mixes with air from the air source 34, thereby forming an air/agricultural product mixture 54. The mixture then flows to the row units or spreading nozzles of the floater 12 via the pneumatic conduits, where the seeds and/or fertilizer are deposited onto the soil. In the present embodiment, air flow through the product distribution box 41 is restricted, thereby resulting in a higher velocity of air flow at the location where the air stream 40 meets agricultural product 42 dropped through the drop tube 52 to accellerate the product and avoid accumulation and plugging.

Figure 3:
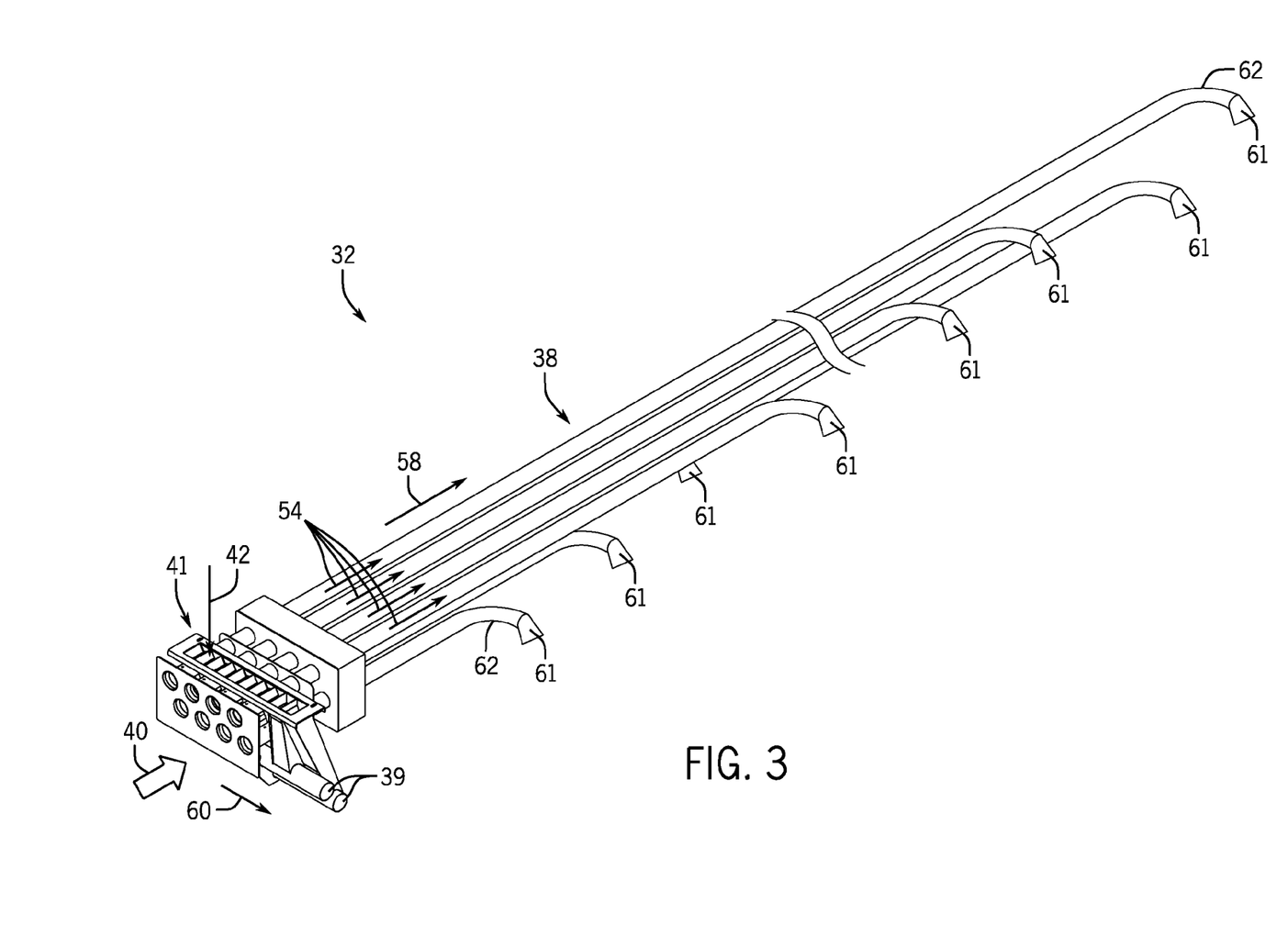
FIG. 3 is a perspective view of an embodiment of a product delivery system that may be used as part of the floater of FIG. 1.

FIG. 3 is a perspective view of an embodiment of the product delivery system 32 that may be used as part of the floater 12 of FIG. 1. As illustrated, the conduits 38 connect to and extend a variable distance from the product distribution box 41. For example, the conduits 38 may extend 1 meter, 2 meters, 5 meters, or more. The conduits 38 may convey the air/agricultural product mixture 54 in a direction 58 perpendicular to a direction of travel of the floater 12. Other conduits 39 may also convey the air/agricultural product mixture 54 from the product distribution box 41 in a rearward direction 60 from the floater 12 such that the air/agricultural product mixture 54 exits the product distribution box 41 perpendicular to the direction 58. The illustrated embodiment shows eight conduits 38 extending in the direction 58 and two conduits 39 extending in the aft direction 60. As may be appreciated, the number of conduits 38 extending in the direction 58, 60 may be modified to be suitable for a particular application. As explained in detail below, each of the different conduits 38 may employ unique characteristics tuned to convey the agricultural product 42 based on the length that the conduit 38 extends from the product distribution box 41. Each of the conduits 38 includes a nozzle 61 that may be configured to deliver the agricultural product 42 to the ground. As illustrated, the nozzles 61 may be coupled to the conduit 38 via an elbow 62. The elbow 62 conveys the agricultural product 42 such that the conduits 38 may extend in the direction 58 parallel to the direction of travel of the floater 12 and deliver the agricultural product 42 in the lateral direction 60 relative to the direction of travel of the floater 12.

Figure 4:
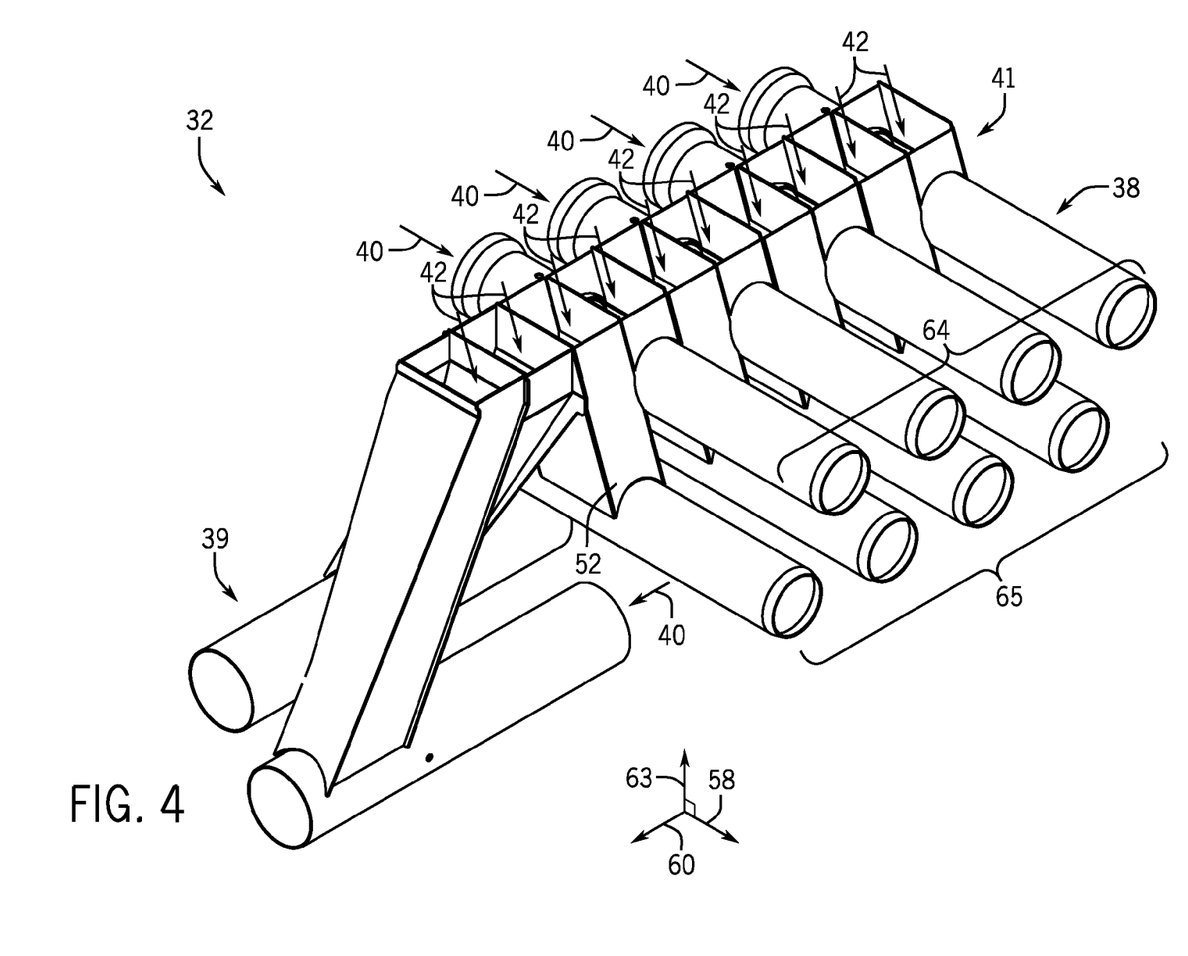
FIG. 4 is a perspective view of an embodiment of a product distribution box that may be used as part of the floater of FIG. 1.

FIG. 4 is a perspective view of an embodiment of the product distribution box 41 that may be used as part of the floater 12 of FIG. 1. The product distribution box 41 receives the airflow 40 from the air source 34 and conveys the airflow 40 through the conduits 38 which in turn convey the air/agricultural product mixture 54 to the nozzles 61 (FIG. 3). As illustrated, one drop tube 52 delivers the agricultural product 42 from the storage tank 26 to each conduit 38. The drop tube 52 is positioned at an angle relative to a vertical direction 63 so that the vertical acceleration of the agricultural product 42 due to gravity is converted into lateral velocity, thereby improving throughput of the agricultural product 42 and reducing the risk of localized plugging. The product delivery system 32 includes upper level conduits 64 positioned vertically over lower level conduits 65. As illustrated, the upper level conduits 64 have a shorter drop tube 52 length than the lower level conduits 65. As may be appreciated, the agricultural product 42 dropped into the lower level conduits 65 may gain more lateral velocity due to gravity than agricultural product 42 dropped into the upper level conduits 64 because of longer drop tube 52 lengths.

Figure 5:
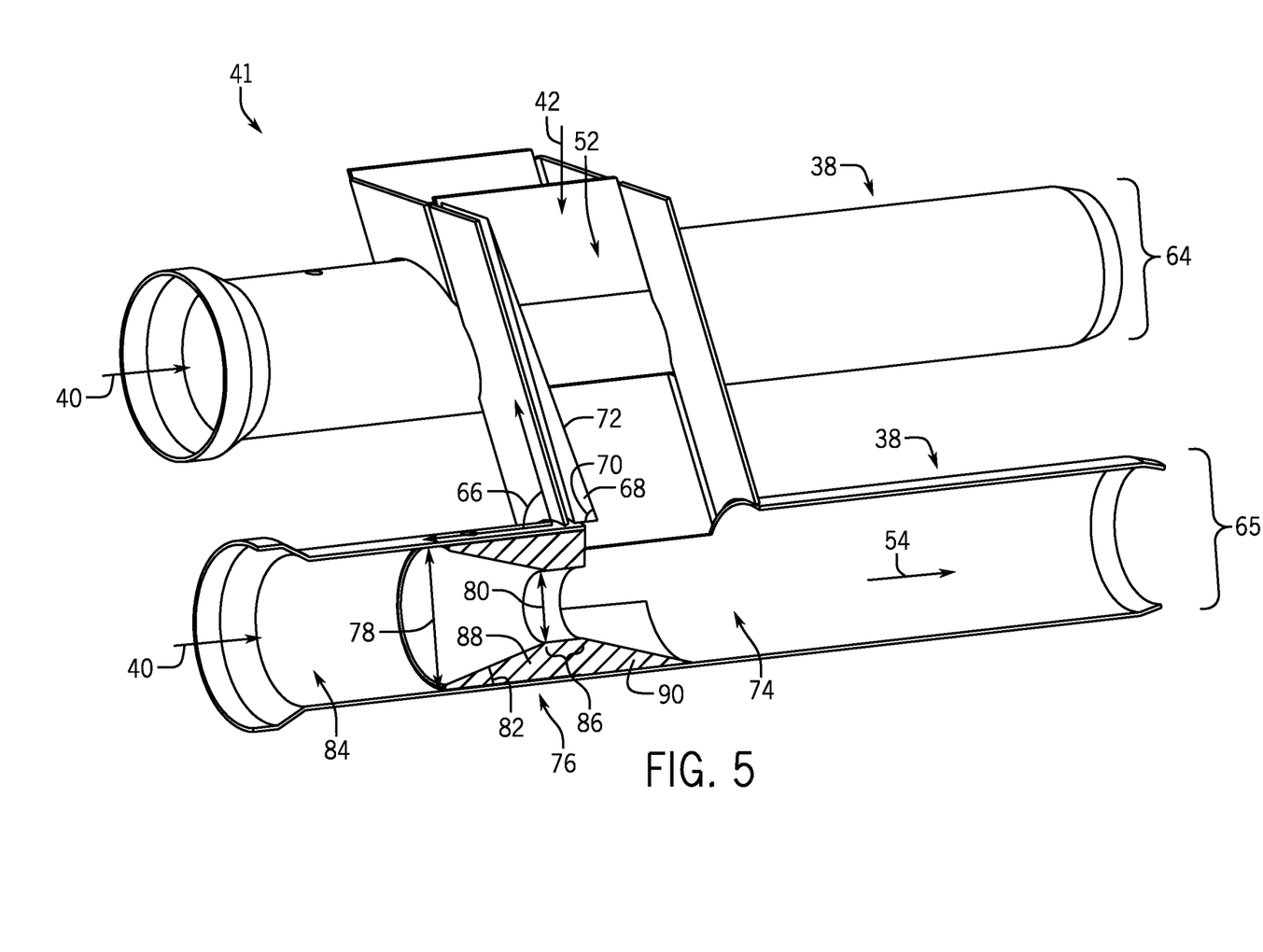
FIG. 5 is a cross-sectional diagram of the product distribution box of FIG. 4.

FIG. 5 is a cross-sectional diagram of the product distribution box 41 of FIG. 4. As illustrated, the drop tube 52 delivers agricultural product 42 to one conduit 38 of the lower level conduits 65. An angle 66 is formed by a junction between the drop tube 52 and the conduit 38. The angle 66 of the drop tube 52 may be the same for the lower level conduits 65 as it is for the upper level conduits 64. The angle 66 may also be different between the upper and lower level conduits 64, 65. Moreover, the angle 66 may include any angle that is greater than an angle parallel to the conduit 38 and less than an angle perpendicular to the conduit 38. For example, the angle 66 may be between 45 degrees and 80 degrees, between 60 and 75 degrees, or may be approximately 70 degrees for all drop tubes 52. Furthermore, each of the multiple drop tubes 52 may have a different angle 66 to customize the lateral velocity of the agricultural product 42 before it enters the conduit 38. FIG. 5 also illustrates a ramp 68 that may be installed within the drop tube 52. The ramp 68 changes an effective drop tube angle 70 for the agricultural product 42 passing through the drop tube 52. The effective drop tube angle 70 is formed by a junction between an internal face 72 of the ramp 68 and the conduit 38. The ramp 68 may be constructed out of any suitable agricultural product including plastic, metal, polymers, or combinations of these materials.

After falling through the drop tube 52, the agricultural product 42 enters the conduits 38 at an agricultural product inlet 74. The agricultural product inlet 74, as illustrated, is adjacent to a constricting passage 76 of the conduit 38. The passage 76 has an internal diameter that decreases from a first diameter 78 to a second diameter 80. An angle 82 is an angle at which the internal diameter changes. The angle 82 may be any suitable angle between 0 degrees and 90 degrees. In some embodiments, the angle 82 is less than approximately 15 degrees, thereby increasing a velocity of air flow through the passage 76. Specifically, as the airflow 40 enters the conduit 38 at an air inlet 84 and passes through the constricting passage 76, the airflow 40 increases velocity, which can result in turbulent flow or back flow. The airflow 40 then combines with the agricultural product 42 at the agricultural product inlet 74 to form the air/agricultural product mixture 54. The constricting passage 76 may also include a straight section 86 including the second internal diameter 80. The straight section 86 may extend for a few centimeters or less.

The constricting passage 76 may be formed within the conduit 38 using an insert 88 that may be inserted into the conduit 38. The insert 88 forms the angle 82. As illustrated, the insert 88 includes a dead air reducer 90 to reduce dead air space that may otherwise allow some agricultural product 42 to remain stagnant within the conduit 38. The angled drop tube 52 and/or the constricting passage 76 increases the velocity of the airflow 40 and/or the agricultural product 42, thereby facilitating a greater throughput of agricultural product 42 through the product distribution box 41. Furthermore, the airflow 40 and/or the agricultural product 42 may flow at greater velocities than in other systems, thereby reducing blockage within conduits 38.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system configured to increase throughput of an agricultural product in an agricultural product delivery system, comprising:
   a first product delivery tube comprising an air inlet, an agricultural product inlet, and an exit nozzle, wherein the agricultural product inlet is disposed between the air inlet and the exit nozzle, and wherein the first product delivery tube is configured to receive the agricultural product from the agricultural product inlet, and to direct an air flow received by the air inlet along a first flow direction to convey the agricultural product through the first product delivery tube and through the exit nozzle; and
   a first drop tube configured to receive the agricultural product, and to convey the agricultural product to the agricultural product inlet along a second flow direction at a first drop tube angle, wherein the first drop tube angle extends between the second flow direction and a longitudinal axis of the first product delivery tube at the agricultural product inlet, and the first drop tube angle is greater than 0 degrees and less than 90 degrees to direct the agricultural product from the first drop tube through the agricultural product inlet partially along the first flow direction to covert gravitational acceleration of the agricultural product into a velocity in the first flow direction to increase throughput of the agricultural product through the first product delivery tube.

2. The system of claim 1, comprising a second product delivery tube and a second drop tube, wherein the second drop tube is longer than the first drop tube.

3. The system of claim 2, wherein the first product delivery tube is configured to convey the agricultural product a first distance, and the second product delivery tube is configured to convey the agricultural product a second distance, greater than the first distance.

4. The system of claim 2, comprising a first plurality of product delivery tubes that includes the first product delivery tube and a second plurality of product delivery tubes that includes the second product deliver tube, wherein the first plurality of product delivery tubes are vertically over the second plurality of product delivery tubes.

5. The system of claim 1, comprising a second product delivery tube and a second drop tube, wherein the second drop tube is configured to convey the agricultural product at a second drop tube angle that is different than the first drop tube angle.

6. The system of claim 1, comprising a second product delivery tube and a second drop tube, wherein the second product delivery tube is positioned substantially perpendicular to the first product delivery tube.

7. The system of claim 1, wherein the first drop tube angle comprises an angle of between approximately 60 to 80 degrees.

8. The system of claim 1, comprising a ramp configured to be inserted into the first drop tube and to decrease the first drop tube angle.

9. A system configured to increase throughput of an agricultural product metering system, comprising:
   a product delivery tube comprising an air inlet, an agricultural product inlet, and an exit nozzle, wherein the product delivery tube is configured to convey an agricultural product between the agricultural product inlet and the exit nozzle via an air flow from the air inlet to the exit nozzle along a first flow direction, wherein an internal diameter of a passage through the product delivery tube decreases between the air inlet and the agricultural product inlet; and
   a drop tube configured to convey the agricultural product to the agricultural product inlet along a second flow direction at a drop tube angle, wherein the drop tube angle extends between the second flow direction and a longitudinal axis of the product delivery tube at the agricultural product inlet, and the drop tube angle is greater than 0 degrees and less than 90 degrees to direct the agricultural product from the drop tube through the agricultural product inlet partially along the first flow direction to covert gravitational acceleration of the agricultural product into a velocity in the first flow direction to increase throughput of the agricultural product through the product delivery tube.

10. The system of claim 9, wherein the passage comprises an insert configured to be disposed within the product delivery tube, and the insert decreases the internal diameter of the passage.

11. The system of claim 9, comprising a ramp configured to be inserted into the drop tube and to decrease the drop tube angle.

12. The system of claim 9, wherein the internal diameter of the passage decreases at an angle less than 15 degrees relative to an external diameter of the product delivery tube.

13. A system configured to increase throughput of an agricultural product metering system, comprising:
   a product delivery tube comprising an air inlet, an agricultural product inlet, and an exit nozzle, wherein the product delivery tube is configured to convey an agricultural product between the agricultural product inlet and the exit nozzle via an air flow from the air inlet to the exit nozzle along a first flow direction and wherein a constrictive passage in the product delivery tube is located where the airstream meets the agricultural product; and
   a drop tube configured to convey the agricultural product to the agricultural product inlet along a second flow direction at a drop tube angle, wherein the drop tube angle extends between the second flow direction and a longitudinal axis of the product delivery tube at the agricultural product inlet, and the drop tube angle is greater than 0 degrees and less than 90 degrees to direct the agricultural product from the drop tube through the agricultural product inlet partially along the first flow direction to covert gravitational acceleration of the agricultural product into a velocity in the first flow direction to increase throughput of the agricultural product through the product delivery tube.

14. The system of claim 13, wherein the drop tube angle comprises an angle of between approximately 60 to 80 degrees.

15. The system of claim 13, comprising a ramp configured to be inserted into the drop tube and to decrease the drop tube angle.

* * * * *